United States Patent [19]

Junck et al.

[11] 4,442,712

[45] Apr. 17, 1984

[54] METHOD AND APPARATUS FOR CORRECTING THE UNBALANCE PRESENT IN A ROTOR

[75] Inventors: Günter Junck, Modautal; Hans Seidel, Rossdorf; Jesus Varona, Darmstadt, all of Fed. Rep. of Germany

[73] Assignee: Gebr. Hofmann GmbH & Co. KG, Maschinenfabrik, Darmstadt, Fed. Rep. of Germany

[21] Appl. No.: 352,573

[22] Filed: Feb. 26, 1982

[30] Foreign Application Priority Data

Feb. 27, 1981 [DE] Fed. Rep. of Germany ....... 3107539

[51] Int. Cl.³ ............................................. G01M 1/38
[52] U.S. Cl. ...................................... 73/462; 409/133
[58] Field of Search ................... 73/462; 364/463, 506, 364/508, 550; 408/2; 409/133

[56] References Cited

U.S. PATENT DOCUMENTS

| | | | |
|---|---|---|---|
| 3,272,975 | 9/1966 | Csech | 73/462 X |
| 3,854,339 | 12/1974 | Muller | 73/462 |
| 3,890,845 | 6/1975 | Muller | 73/462 |
| 4,104,919 | 8/1978 | Brunnengraber | 73/462 |

FOREIGN PATENT DOCUMENTS

| | | |
|---|---|---|
| 2651883 | 5/1978 | Fed. Rep. of Germany . |
| 2830070 | 1/1980 | Fed. Rep. of Germany . |
| 860847 | 3/1961 | United Kingdom . |
| 1531646 | 11/1978 | United Kingdom . |
| 2026702 | 2/1980 | United Kingdom . |

Primary Examiner—James J. Gill
Attorney, Agent, or Firm—Fleit, Jacobson, Cohn & Price

[57] ABSTRACT

A method and an apparatus for correcting the unbalance present in a rotor in one or several correction steps by adding or removing material only to or from given points on the rotating body on which only a limited quantity of material is available for correction, with the unbalance being resolved into components as given by the design of the rotor, with correction being carried out in one of several given components, and with the unbalance determined being eliminated in the given components as to the possibility permitting the least quantity of material to be added or removed in a minimum number of correction runs, so that finally an uninterrupted sequence of correction points is available on the rotor.

15 Claims, 4 Drawing Figures

METHOD AND APPARATUS FOR CORRECTING THE UNBALANCE PRESENT IN A ROTOR

BACKGROUND OF THE INVENTION

The present invention relates to a method and apparatus for correcting the unbalance present in a rotor.

DESCRIPTION OF THE PRIOR ART

German published patent application DE-OS 2 830 070 describes a method of correcting the unbalance in rotating bodies, in which the correction points are selected among all possibilities between a maximum of one half thereof and a minimum of two points, each in reference to the unbalance vector, and in which a variable number of non-zero units can be provided at each correction point so as to eliminate the unbalance.

As a result of this method, equal amounts of unbalance can be corrected at several points, but it is not possible to eliminate the unbalance by removing or adding the least quantity of material within the shortest possible time since the selected correction points are not arranged in an uninterrupted sequence, this in turn being due to the fact that maximum permissible units are provided for the individual correction points stored in one matrix memory.

Furthermore, German published patent application DE-OS 2 651 883 describes an apparatus for detecting and processing the amount and location of the measured unbalance, which is indicated by a moving light spot on a display screen of a balancing machine, on which screen is arranged, around a central tolerance circle, at least one range of a plurality of correction fields referred to the given quantity which can be removed for unbalance elimination due to the specific design of the rotor, and arranged in an uninterrupted sequence.

With this apparatus, a resolution of the unbalance into more than two correction points is not possible so that particularly in the event of an initial unbalance greater than the quantity of material that can be removed from these two correction points, the rotor will have to be considered a reject.

SUMMARY OF THE INVENTION

Therefore, it is an object of the present invention to provide a method and an apparatus for correcting the unbalance present in a rotor, i.e., for permitting unbalance correction at one or several correction points in consideration of the required tolerance, if necessary, and with the least quantity of material removed or added.

In accordance with the inventive method and apparatus, the unbalance is resolved into one or several correction points in uninterrupted sequence depending on its amount and angular location, and the permissible tolerance, if any. Such resolution is performed, for example, by a logical decision circuit, which also decides if the correction steps are carried out simultaneously or one after the other.

In addition, the correction points of the first correction step are stored and taken into account when the correction points of the second step are determined.

The apparatus realizing the above-mentioned method is distinguished by a device making available the measured unbalance as to amount and phase position or components, and the device is followed by a logical decision circuit, a logical component selecting circuit, and a computer resolving the unbalance into components. These circuits control the correction unit altogether.

BRIEF DESCRIPTION OF DRAWINGS

A preferred embodiment of the present invention is illustrated in the accompanying drawings, in which.

DESCRIPTION OF THE PREFERRED EMBODIMENT

Figure 1:
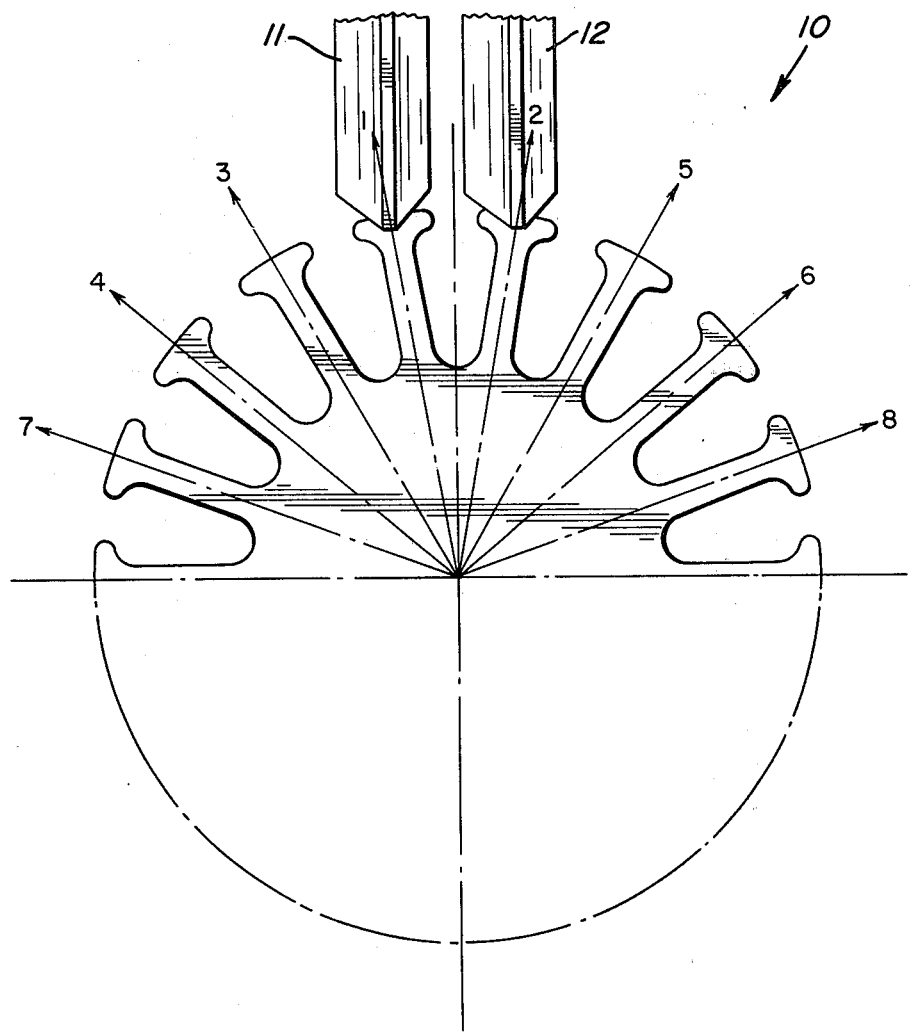
FIG. 1 is a schematic diagram of a rotor with the correction tools applied.

FIG. 1 illustrates part of an electric motor armature 10, which is representative of a rotor in which unbalance correction is possible only at given correction points, and having a limited quantity of material that can be removed for mass correction. With the electric motor armature 10, the unbalance can only be corrected on the laminations, preferably by milling. Other subtractive methods, such as drilling, or additive methods, such as insertion of correction weights into the armature slots between the segments, are also acceptable.

The armature 10 in this preferred embodiment has eighteen segments, eight of which numbered 1 to 8, are illustrated in FIG. 1. Correction of unbalance will be performed on one or several of the segments 1 to 8, depending on the amount and phase position of the measured unbalance. The inventive method, of course, can be applied analogously to rotors having any other number of segments. Correction is carried out with single cutters 11 and/or 12, or respective double cutters, which are arranged preferably on a so-called sliding spindle of a conventional correction unit.

Figure 2:
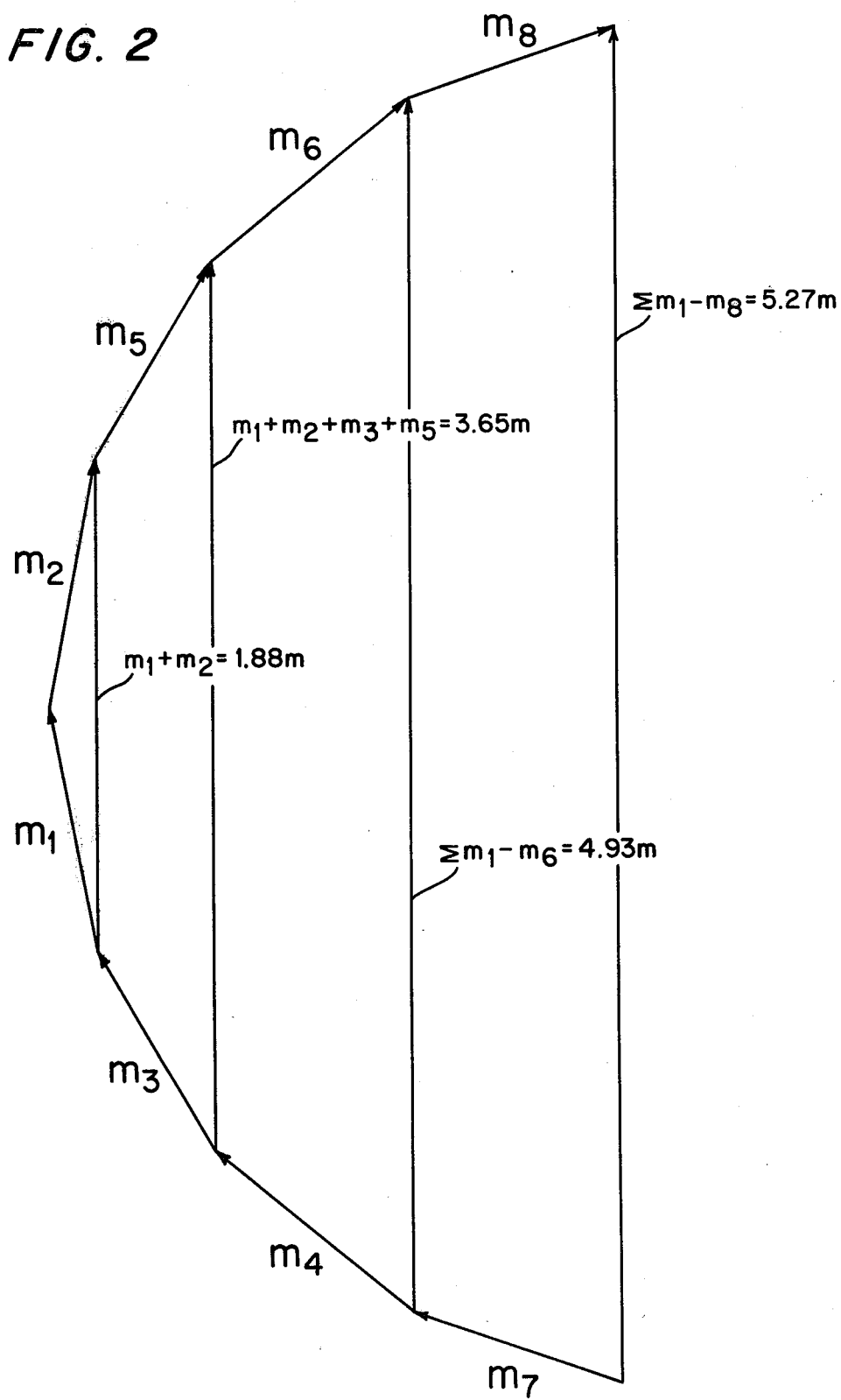
FIG. 2 is a schematic diagram of the various possibilities for correction in consideration of the position of the correction points.

FIG. 2 illustrates the maximum quantities $m_1$ to $m_8$ which can be corrected in the individual components, and the relative correction vectors, as well as all possible corrections of the preferred embodiment. Correction is performed in one component (e.g., $m_1$ with "m" being the maximum quantity to be corrected) with one single tool, if the position of the unbalance coincides precisely with a segment (e.g., segment 1) and if the unbalance can be eliminated in this segment completely, or, on the other hand, if a minor unbalance is situated near a segment so that the residual unbalance to be expected after correction is within tolerance. Correction is carried out by means of two single tools separately controlled, if the unbalance is situated between two components (e.g., segments 1 and 2) and can be completely eliminated by correction in the two segments (possibility of correcting $m_1 + m_2 = 1.88$ m). Correction is performed by means of a double tool if the unbalance is situated precisely between two segments, or if a minor unbalance is situated near the center line of the armature slot so that the residual unbalance expected after correction is within the preset tolerance limits. Correction is carried out by means of two double cutters separately controlled, if the unbalance is situated between two segments, or if it is situated on one segment and the unbalance is so large that it cannot be eliminated by mass removal from one segment only.

If the unbalance is so large that its elimination is not possible in one correction step, rebalancing is carried out, preferably in the segments 4 and 7 and 6 and 8, or in the segments 4 and 6 only, with the correction points (segments 1, 3, 2, and 5) and the correction possibilities $m_1+m_2+m_3+m_5=3.65$ m of the first correction step being stored temporarily and taken into account when the unbalance is resolved into the components of the second correction step.

Due to the sequence of correction points located next to each other without interruption, unbalance correction is possible with the least quantity of material removed. An uninterrupted sequence of adjacent correction points results in reduced removal of material. When the correction points are interrupted and the angle between the corrections points on the various components of the rotor is large, the amount of material that is required to be removed is greater.

The correction possibilities of the different given correction planes are selected independent of each other by means of one or several analyzers.

Figure 3:
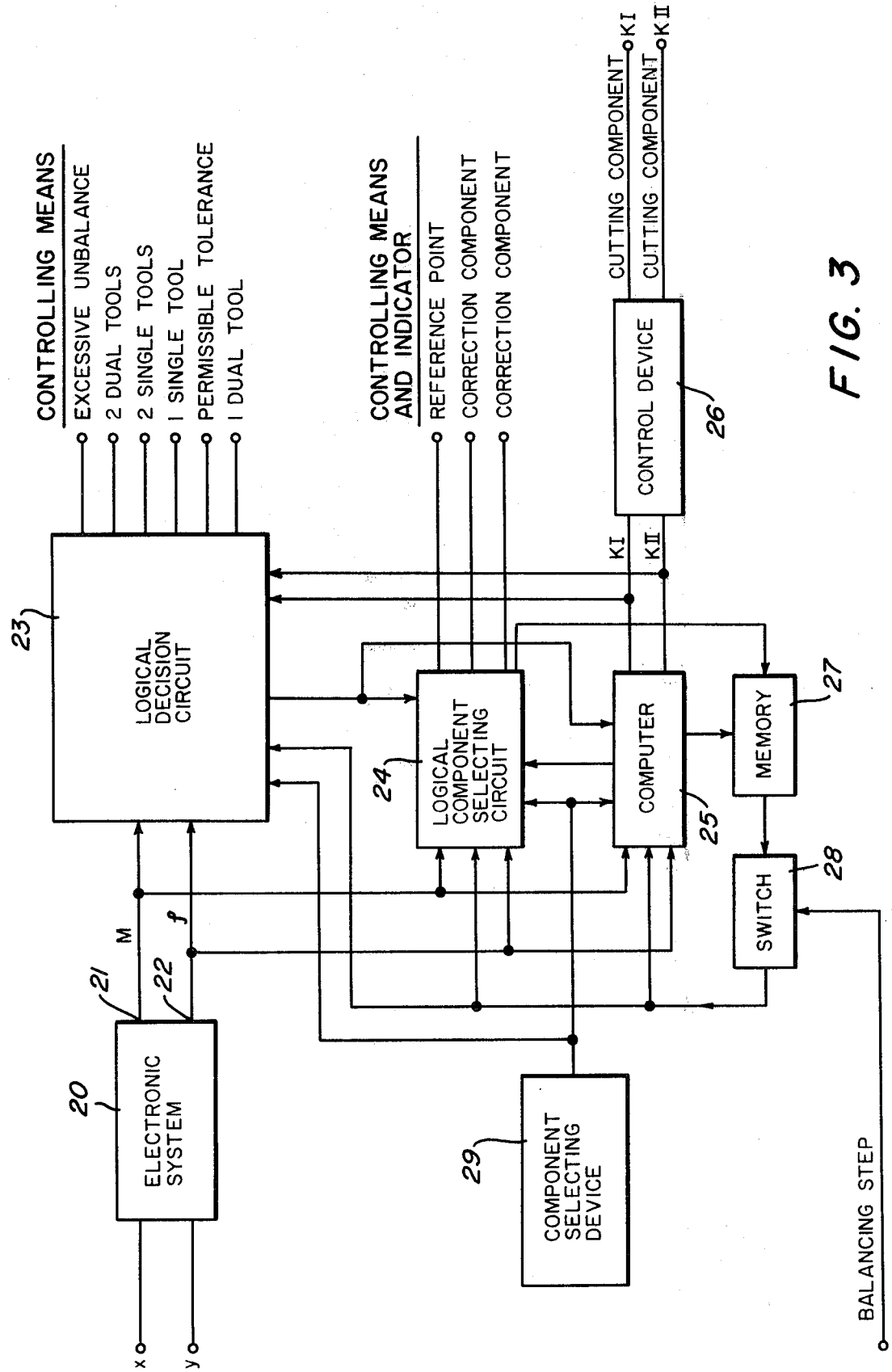
FIG. 3 is a simplified diagram of a circuit realizing the inventive method.
Figure 4:
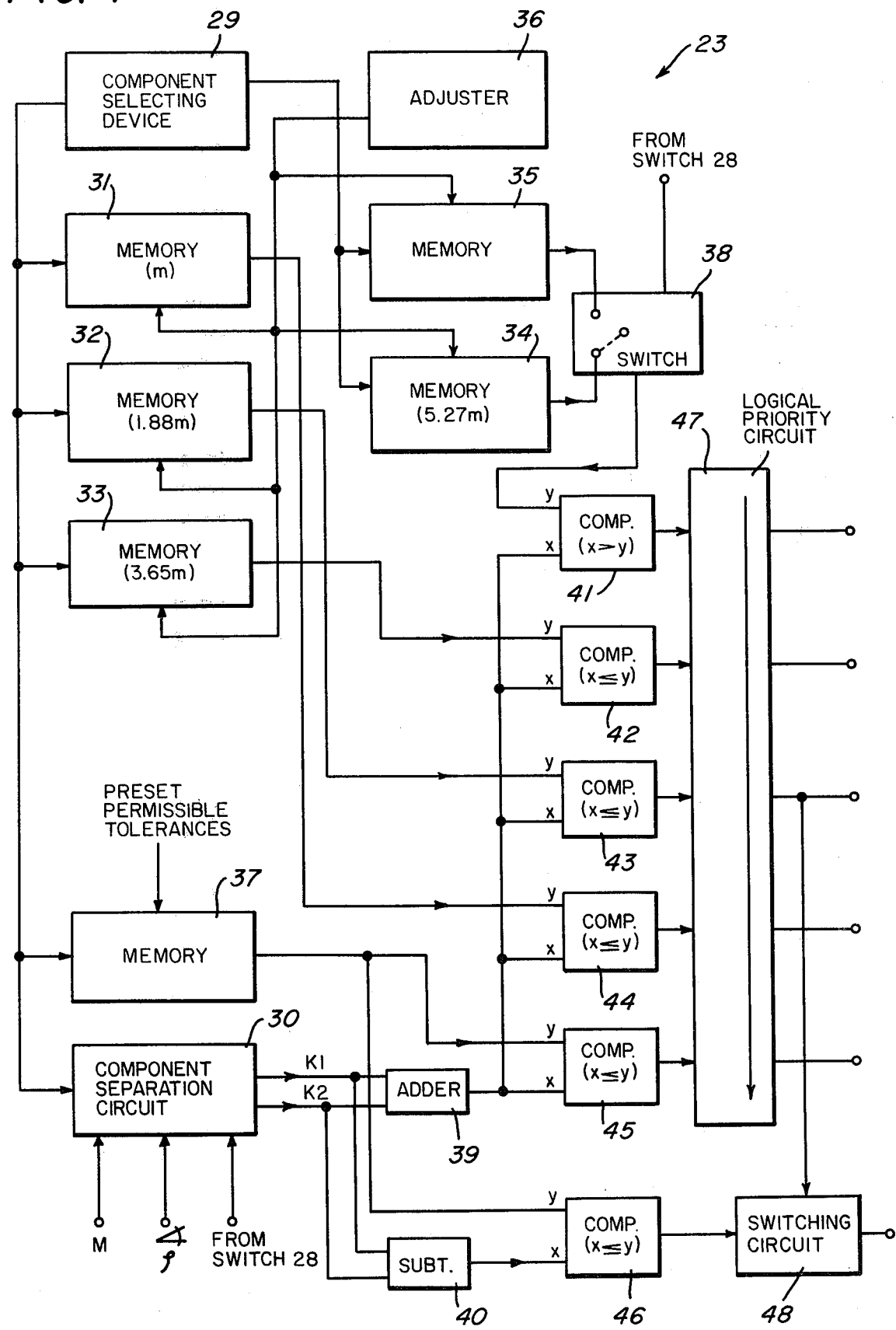
FIG. 4 is a diagram of the logical decision circuit illustrated in FIG. 3.

FIGS. 3 and 4 are block diagrams of the circuits controlling the correction unit, with processing of the measured data being performed either by analogue or digital means.

In a balancing machine, the unbalance data of one or several planes are received by known transducers and passed to an electronic system 20 that determines the unbalance as to amount and location, or the unbalance data are received in respective components by digital means and entered into the electronic system 20 for further processing. The electronic system 20 makes a determination of the unbalance according to the magnitude and direction of unbalance signals and can, for example, be executed in accordance with the teachings of Great Britain Pat. No. 860,847, incorporated herein by reference. As illustrated in FIG. 3, the amount of unbalance "M" is available on the output 21 of the device 20, and its phase position "f" is available on the output 22.

These unbalance data are entered into the logical decision circuit 23 (which is illustrated in more detail in FIG. 4), the logical component selecting circuit 24, and the computer 25. The components selected among those available are preset manually or automatically on the component selecting device 29, depending on the rotor, and entered into the logical decision circuit 23, the logical component selecting circuit 24, and the computer 25. The signals from the electronic system 20 are initially sent to the component computer 25 which then calculates the component's magnitudes in accordance with the number of components of a particular rotor. The component computer 25 can for example correspond to a computer in accordance with U.S. Pat. No. 3,890,845, incorporated herein by reference. For instance with the rotor illustrated in FIG. 1, the component selecting device would be set to indicate eighteen correction points because the armature 10 has eighteen segments.

The unbalance is read out on meters and an indexing device is controlled as to the output signals of the logical decision circuit 23, which output signals are further used for selecting the correction tools, and are then entered into the logical component selecting circuit 24 and computer 25. The selecting circuit 24, depending on the number of correction points available, as set by device 29, the position, and the magnitude of the unbalance, selects the particular component or components of the rotor to be balanced. An indexing device indexes the rotor 10 such that the individual components to be corrected are situated below the correction unit, i.e., in the illustrated embodiment of FIG. 1, under one or both of the cutters 11 and 12 of the milling unit.

The indexing device (not shown) is a conventional element which is implemented by digital or analogue logic. In the indexing device, a sensor senses the present position of the rotor and feeds a signal representative of the sensed position to a comparator. The comparator also receives a signal representative of the desired position of the rotor and generates a control signal representative of the deviation of the sensed position from the desired position. Depending on the size of the control signal, a motor is energized to rotate the rotor until the desired position is reached, thus achieving indexing in a conventional servo-like manner.

The correction cuts in each of the components KI and KII of the correction planes I and II (indicated as outputs of computer 25 in FIG. 3) are preferably provided one after the other. If the correction tools are controlled accordingly, it is also possible to correct simultaneously each of the components KI and/or KII of the correction planes I and/or II, or even the resultant unbalance of the planes I and II.

The output data of the computer 25 are preferably passed to control device 26 which takes into account non-linearity of the correction tools in unbalance elimination. Since the compensating mass is not directly proportional to the feed action of the compensating tools, such correction is necessary. Thus, the output of the control device 26 takes into account the special shape of the milling machines or cutters 11 and 12 and serves to control the milling depth of the cutters 11 and 12.

The correction points selected for the first correction step are stored in the memory 27. If a second step is required due to the high initial or residual unbalance, the stored correction points are called from the memory 27 by means of switch 28 and passed to the logical decision circuit 23, the logical component selecting circuit 24 and computer 25, which will take them into account when selecting the correction points of the second step.

The function of resolution into components is carried out by means of the computer 25, which maintains the selected components or changes them in accordance with the acknowledgement given by the logical decision circuit 23.

The logical component selecting circuit 24 is provided with the information already mentioned, and with the phase reference signal of the rotor 10, which is required for control of the indexing device. In the circuit 24, the components are selected for use in unbalance compensation, depending on the number of components handled by the component selecting device 29, as well as the magnitude and position of unbalance.

The logical decision circuit 23 generally shown in FIG. 3 is illustrated in more detail in FIG. 4.

The unbalance data, as to amount and phase position or components, which are available on the output of the device 20, are passed to the logical decision circuit 23 for resolution into components in component separation circuit 30, which is controlled by the component selecting device 29 (also shown, for convenience, in FIG. 4). In device 29, the number of equalizing points is preselected (with respect to the rotor 10, it is the number of poles), so that the circumference of the rotor 10 is divided into equal parts corresponding to the components.

In the circuit 30, the determined unbalance is broken into components, both as to size and phase position. The number of components will be a function of the available number of correction points, and the amount and location of unbalance. In the circuit 30, recalculation of the determined unbalance which is present according to size and phase position (for example, in 90° components) takes place in accordance with known geometric rules.

The data stored in the separate memories 31 to 35 depend on the number of components, which is preferably identical with the number of correction points, and the stored magnitudes conform, for example, to the values given in FIG. 2 and discussed in more detail below.

The memories 31 to 35 are furthermore influenced by the adjuster 36, by means of which the maximum milling depth of the cutters 11 and 12 is preset. This adjuster 36 is followed by an equalizer taking into account non-linearity of the correction tools.

The memory 37 stores the permissible tolerances which are preset, depending on the number of components.

Memory 31 stores the maximum quantity of material to be removed ("m" in FIG. 2) for one component, memory 32 the maximum quantity for two components ("1.88 m" in FIG. 2), and memory 33 the maximum quantity for four components ("3.65 m" in FIG. 2), with all these components being arranged in an uninterrupted sequence. Memory 34 stores the maximum quantity of material which can be removed (maximum reduction magnitude for compensation) in two compensation steps ("5.27 m" in FIG. 2), and memory 35 stores the maximum quantity which can be removed in the second compensation step above. According to FIG. 2, these are the compensation masses $m_7$, $m_4$, $m_6$, and $m_8$ (vector sum $5.27\text{ m} - 3.65\text{ m} = 1.62\text{ m}$). The output value of memory 35 is passed on by means of switch 38 if a second correction run is necessary, and accordingly memory 34 is blocked.

The adding circuit 39 carries out a vectorial addition of the component magnitudes K1 and K2, made available by the circuit 30 and depending on the unbalance determined, and the subtractor circuit 40 calculates the difference between the component magnitudes K1 and K2. The output data of the adding circuit 39 are passed to the comparator circuits 41 to 45, the outputs of which are connected to the inputs of the logical priority circuit 47.

The comparator circuits 41 to 45 compare the output value of the adding circuit 39 with individual data from the memories as follows: comparator 41: x equals circuit 39 and y equals memory 34 or 35; comparator 42: x equals circuit 39 and memory 33; comparator 43: x equals circuit 39 and y equals memory 32; comparator 44: x equals circuit 39 and y equals memory 31; and comparator 45: x equals circuit 39 and y equals memory 37. The logical priority circuit 47 selects that one of the enabled outputs of the comparator circuits 41 to 45 having the highest priority. In FIG. 4, the order of priority of input to circuit 47 is from top to bottom.

Thus, circuit 47 can determine that the initial unbalance is too great (K1+K2 greater than 5.27 m or the contents of memory 25 detected by comparator 41); it can select use of two double tools (K1+K2 equal to or less than 3.65 m detected by comparator 42); it can select use of one double tool or two single tools (K1+K2 equal to or less than 1.88 m detected by comparator 43); it can select use of one single tool (K1+K2 equal to or less than m detected by comparator 44); it can determine that no correction is necessary because unbalance is within the preset tolerance (K1+K2 equal to or less than permissible tolerance preset in memory 37 detected by comparator 45); and it can determine a value subsequently used to determine whether single or double tools should be used for mass correction (K1−K2 equal to or less than permissible tolerance preset in memory 37 detected by comparator 46).

With unbalance correction by means of two single tools, it is possible to compare, in circuit 48 (which is actually part of circuit 47), the preset tolerance with the difference calculated in comparator 40 between the two components K1 and K2 so that correction could be carried out with one double tool or two single tools, as the case may be.

If the unbalance position occurs between two laminae and the unbalance can be completely compensated by the compensation in two laminae ($m_1 + m_2 = 1.88\text{ m}$), the compensation is made with two individual tools whose feed action is controlled separately. If now the unbalance is located relatively close to the middle line between two laminae, i.e., the two compensation components $K_1$ and $K_2$ are nearly equal, a double tool can be employed instead of two separately controlled individual tools.

Thus, in the subtractor 40, the difference between $K_1$ and $K_2$ is determined and inserted in the comparator 46. The comparator 46 compares the difference between $K_1$ and $K_2$ with the pre-selectable tolerance magnitude 37 and inserts the result into the circuit 48. If the remaining rest unbalance is smaller than the tolerance, the compensation is made with a double tool; if, however, the remaining rest unbalance is greater than the tolerance, the compensation must take place with two separately controlled individual tools.

The invention makes it possible to eliminate the unbalance by removing a minimum of mass in the shortest possible time.

While the invention has been described herein in terms of preferred embodiments, numerous variations may be made in the arrangement illustrated in the drawings and herein described without departing from the invention, as set forth in the appended claims.

What is claimed is:

1. A method of correcting the unbalance present in a rotor in the minimum number of correction steps comprising performing mass correction by adding or removing material only to or from given points on the rotor, with only a limited quantity of material being available for correction at each point, with the unbalance being resolved into correction components determined by the design of the rotor, the correction being carried out in at least one of several components of the rotor and the unbalance determined being eliminated in said components so as to permit the least quantity of material to be added or removed in a minimum number of correction runs so that finally an uninterrupted sequence of correction points is determined for the rotor.

2. Method according to claim 1, in which one of several correction possibilities is selected, with this possibility permitting removal from or adding to of a maximum quantity of material to a minimum number of components.

3. Method according to claim 1 or 2, in which the components determined are compared with the maximum quantity of material to be added or removed as to the respective correction possibility, and at least one correction tool is controlled accordingly, which at least one tool is associated with that correction possibility permitting the least quantity of material to be added or removed in a minimum number of correction runs.

4. Method according to claim 1 in which the maximum quantities of material removed or added and associated with the correction possibilities are stored separately, and in which the components determined are compared with these quantities one after the other.

5. Method according to claim 4, in which comparison begins with that correction possibility permitting a maximum quantity of material to be added to or removed from a single component, and continues with the possibilities permitting the next inferior quantities to be removed from or added to more than one component.

6. Method according to claim 5, in which comparison begins with determination of rejects.

7. Method according to claim 6, in which comparison ends with comparison of the unbalance data with a tolerance.

8. Method according to either of the claims 1 to 7, in which the correction points of the first correction step are stored and taken into account when the correction points for the second correction step are determined.

9. An apparatus for correcting the unbalance present in rotating bodies of the type in which limited mass correction is possible at only a limited number of predetermined positions on the rotor, said apparatus comprising means for determining the amount and location of unbalance in the rotor, said means for determining having outputs from which the amount and phase position of the unbalance for the respective component data are available; a logical decision circuit having inputs connected to said outputs of said determining means; a logical component selecting circuit having inputs connected to outputs of said logical decision circuit; a computer for resolving the unbalances into components of said rotor, said computer being connected to said outputs of said means for determining, said logical decision circuit, and said component selecting circuit; a control device controlled by said computer; and correction means responsive to said control device for correcting the mass of the rotor to thereby correct rotor unbalance.

10. Apparatus according to claim 9, in which the logical decision circuit includes a plurality of memories, in which memories the maximum quantities of material removed or added as to the individual correction possibilities are stored, said apparatus further comprising a plurality of comparator circuits connected to said memories, said comparator circuits comparing the stored quantities as to the individual correction possibilities with the amount and phase position of the unbalance of the rotor, and a logical priority circuit connected to outputs of the comparator circuits, said logical priority circuit controlling the correction means depending on the output data of the comparator circuits.

11. Apparatus according to claim 10, further ciomprising an additional comparator circuit and a subtractor circuit, the logical priority circuit being followed by the additional comparator circuit which is further connected to an output of the subtractor circuit into which have been entered the difference between two determined components K1 and K2 of unbalance and a permissible tolerance.

12. Apparatus according to claim 10 further comprising separate memories for storing the maximum quantities of material to be removed or added, and associated comparator circuits connected to said memories so as to determine the required number of correction steps.

13. Apparatus according to claim 12, in which the correction means includes tools associated with the memories and the comparator circuits associated therewith in the following sequence determined by the logical priority circuit:

possibility of correcting four components by means of two double tools possibility of correcting two components by means of one double tool or two single tools possibility of correcting one component by means of one single tool.

14. Apparatus according to claim 10, in which the logical priority circuit determines the sequence of the comparisons between the components selected on the basis of the amount and phase position of unbalance and the maximum quantities of material to be removed or added as to the individual correction possibilities, which quantities are stored in respective ones of said plurality of memories so that consequently in the sequence of comparisons the maximum quantity to be removed or added is always inferior to that of the previous comparison.

15. Apparatus according to claim 9 further comprising a memory for receiving correction points of a first correction step, the memory being connected to the inputs of the logical decision circuit, the logical component selecting circuit, and the computer so that when a second correction step is subsequently performed the correction points of the first correction step are taken into account when those for the second step are determined.

* * * * *